March 18, 1947.  G. G. McNAMARA, JR  2,417,560
TRACTOR LOADING ATTACHMENT
Filed May 3, 1945  4 Sheets-Sheet 1

Inventor:
Gordon G. McNamara, Jr.
By: Paul O. Pippel
Atty.

March 18, 1947.　　G. G. McNAMARA, JR　　2,417,560
TRACTOR LOADING ATTACHMENT
Filed May 3, 1945　　4 Sheets-Sheet 3

Inventor:
Gordon G. McNamara, Jr.
By: Paul O. Pippel
Atty.

March 18, 1947. G. G. McNAMARA, JR 2,417,560
TRACTOR LOADING ATTACHMENT
Filed May 3, 1945 4 Sheets-Sheet 4

Inventor:
Gordon G. McNamara, Jr.
By Paul O. Pippel
Atty.

Patented Mar. 18, 1947

2,417,560

UNITED STATES PATENT OFFICE 2,417,560

TRACTOR LOADING ATTACHMENT

Gordon G. McNamara, Jr., Chicago, Ill., assignor to International Harvester Company, a corporation of New Jersey Application May 3, 1945, Serial No. 591,805

12 Claims. (Cl. 214—140)

This invention relates to a new and improved tractor loading attachment.

The principal object of this invention is the provision of a loading attachment for tractors having means for initially raising the attachment independently of the tractor and subsequently lifting the entire attachment on the tractor.

An important object of this invention is to provide a tractor-mounted material loader with means for breaking a portion of the material to be lifted free from the entire pile of material.

Another important object is the provision of means for the power lifting of a tractor-mounted loader arranged so that the loader is initially raised on a leg which is pushed downwardly against the ground during the initial actuation of the power lifting device.

There are many loaders, such as manure loaders on the market, and yet very few, if any, have received general acceptance by the public. As a rule, the manure loaders extend forwardly from the tractors on which they are mounted, and the operator therefore may drive the tractor and loading attachment directly into the pile of manure to be moved. The greatest load on the tractor is occasioned during the breaking of the shovel load loose from the pile. So great is this initial load on the tractor that it invariably eventually causes damage. Tractor manufacturers therefore object to having manure loaders attached to their tractors, and further when the tractors are equipped with pnuematic tires, use of front-mounted manure loaders becomes almost impractical. It is therefore an important object of this invention to remove the initial great load from the tractor and apply it instead to one or more temporarily employed legs which form a part of the loading device. This leg is automatically extended downwardly to contact the ground upon initial actuation of the loader, and the load is lifted about the leg during its initial movement or at the period of greatest load. After this initial breaking loose of the load, the shovel continues to move upwardly during which time the legs are also carried upwardly and the load is shifted from the legs to the tractor. The mere lifting of the material carried by the shovel cannot be excessive, for the reason that the shovel is of a size not to exert too much strain on the tractor on which the device is mounted. Hence the shifting of the load over to the tractor after it has been severed from the pile is not detrimental to the tractor.

A further important object is to provide a mobile lifting device capable of initially receiving a load on automatically downwardly extending legs and further capable of automatically lifting the legs during continued lifting of the load.

A still further important object is the provision of a tiltable substantially balanced loader shovel having remotely controlled latch means for effecting easy release thereof.

Other and further important objects will become apparent from the disclosure in the following specification and accompanying drawings, in which.

As shown in the drawings.

Reference numeral 10 indicates generally a conventional farm tractor having a narrow longitudinal body portion which includes an engine 11 and a chassis structure 12. A front rolling support is provided at the forward end of the tractor and is in the form of closely positioned dirigible wheels 13. The rear of the tractor is supported by relatively large traction wheels 14 mounted on an axle structure 15 extending laterally from each side of the longitudinal chassis 12. A loading device or material holding structure, consisting of a shovel 16, positioned in front of the tractor has side frame arms 17 and 18 extending rearwardly therefrom to a point adjacent the axle structures 15 where the arms are hinged around pins, one of which is shown at 19.

Figure 8:
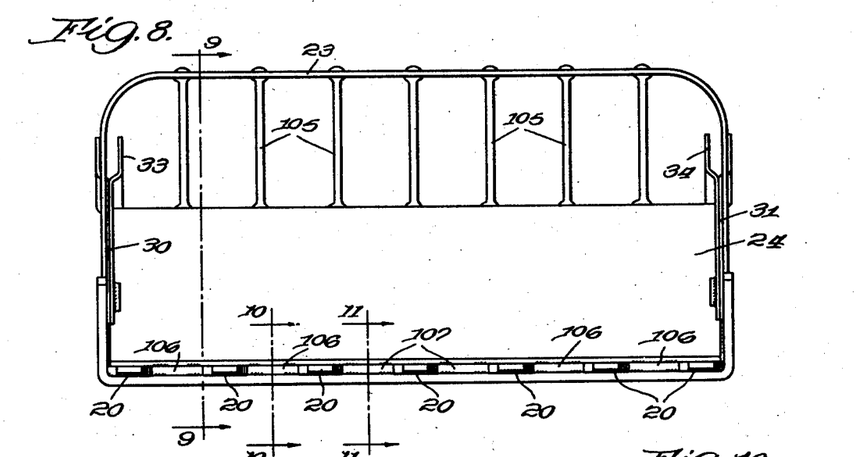
Figure 8 is a front elevational view of the loader shovel shown in Figure 4.
Figures 9, 10:
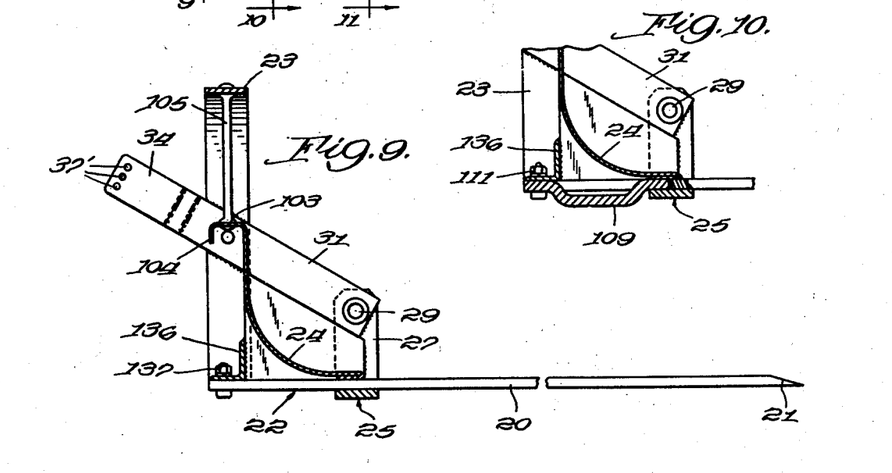
Figure 9 is a sectional view taken on the line 9—9 of Figure 8.
Figure 10 is a sectional view taken on the line 10—10 of Figure 8.

As best shown in Figures 4, 8, 9, 10 and 11, the shovel 16 includes forwardly projecting tines or fingers 20 having tapered or sharpened ends 21 to enable the tines to readily break through a pile of manure or other material to be loaded. The bucket or shovel 16 is equipped with a heel portion 22 which is formed by an inverted U-shaped member 23 which is welded or otherwise attached to an angle iron 136 to which the inner ends of the forwardly projecting fingers 20 are attached by shear bolts 137. The top or inside of the heel portion 22 is equipped with a curved shield 24 which lies on top of the tines 20 and extends rearwardly and upwardly as shown in Figure 9. The upper and rearward edge of this shield 24 is bent rearwardly as shown at 103 and downwardly at 104. The horizontal portion 103 forms the lower support for a series of rods 105 which are riveted thereto. These rods 105, as best shown in Figures 8 and 9, extend between the upper part of the U-shaped member 23 and the horizontal portion 103 of the shield 24. An upright U-shaped bracket 25 extends beneath and at the forward end of the shield 24 of the heel 22. The U-shaped member 25 consists of upwardly extending arms 26 and 27 to form a substantial enclosure for the heel portion 22 of the loader shovel. As best shown in Figure 8, the tines 20 are separated by spacer members 106 welded between the flat bottom portion of the U-shaped member 25 and the under side of the heel shield 24.

Figure 11:
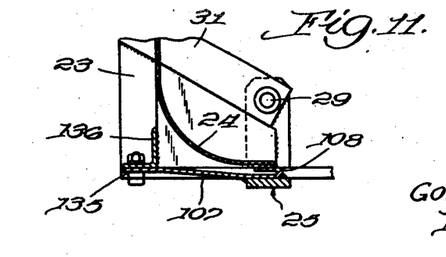
Figure 11 is a sectional view taken on the line 11—11 of Figure 8.

The tines 20, as previously stated, are attached only at one point of the shovel and that is at the heel 22 through the angle bar 136 by shear bolts 137. The object of the shear bolts 137 is to eliminate bending or distorting of any structural portions of the loader shovel. When the shovel is driven into an immovable object, a rearward force will be created by the tines 20. The shovel is designed and constructed so that the bolts 137 may shear prior to the time at which bending of the U-shaped member 23 or the angle bar 136 would occur. In order that the angle bar 136 may be held sufficiently rigid to cause the bolts 137 to shear, tie members 107 are extended between the U-shaped members 23 and 25, as shown in Figure 11. The rear ends of the tie members 107 are bolted to the angle bar 136 as shown at 135, and the forward ends are bent upon themselves as at 108 and are substantially the same size as the spacer members 106 so that they in effect act as spacers between the central tine members 20 as shown in Figure 8. These forward portions 108 of the tie members 107 are welded between the lower portion of the U-shaped member 25 and the under side of the heel shield 24.

In order to save wear on the larger parts of the shovel a pair of wear plates 109, as shown in Figure 10, are positioned between the rear angle bar 136 and the forwardly positioned U-member 25. These wear plates 109 are in the form of runner members and extend downwardly centrally between the U-shaped members 23 and 25 so that they contact the ground or other surface on which the shovel is operating and receive the entire wear on the bottom of the shovel. These wear plates 109 are fixed in position between the shovel tines and at their forward ends are inserted behind the tine spacing members 106 and at their rear ends are attached by bolts 111 as shown in Figure 10. This prevents wear on the U-shaped members 25 and also the angle member 136. The upwardly extending arms 26 and 27 of this U-shaped member 25 form the pivotal supports for the forward ends of the frame arms 17 and 18. These pivotal connections are shown at 28 and 29 and the corresponding holes for these connections are shown in the arms 17 and 18 in Figure 5 at 28' and 29' respectively. Mounted on these same pivotal connections are rearwardly extending arms 30 and 31. These arms 30 and 31 form a fixed part of the shovel 16 inasmuch as they are also attached to the inverted U-shaped member 23. One of these connections is shown at 32. The shovel 16 must be capable of being tilted forwardly about the pivot points 28 and 29 so that material lifted by this loader may be dumped into a wagon, truck or other receptacle. The arms 30 and 31 project rearwardly beyond their connections to the member 23 and have bifurcated rear end portions 33 and 34 respectively. Roller members are mounted for rotation between the bifurcations 33 and 34 of each arm 30 and 31. One of the bifurcations 33 is broken away to show the roller 35 which is mounted on a stub shaft 36. It should be realized that the rollers may be simple projections. The roller in the arm 31 is not shown but the stub shaft 37 is visible in Figure 4. On viewing Figure 9 it is evident that there are three holes 37' on the arms 34 to provide for three adjustments of the loader shovel. Latch mechanisms are adapted to engage the roller wheels 35 between the bifurcations 33 and 34 to thus lock the shovel in load-holding position.

Release of these latch mechanisms permits the shovel to swing downwardly about the hinge formed by the pivots 28 and 29. The latch mechanisms consist of a pair of upright arms 38 and 39 which are pivoted at 40 and 41 respectively on the arms 17 and 18. Each of these arms at its upper end has a forwardly projecting ledge or keeper 42 and 43 which is adapted to engage the upper part of the roller wheels 35. Each of the arms also has shovel unbalancing actuators in the form of bail-like members 44 and 45 which are welded thereto so as to provide a forward and rearward projection for each arm. The forward portion of each bail member 44 and 45 is upwardly inclined as shown at 46 on the bail 44. These bail members 44 and 45 extend beneath the roller wheels 35, and upon simultaneous rearward movement of both arms 38 and 39, the removal of the keepers 42 and 43 will permit upward swinging of the roller wheels 35 and thus the entire shovel 16 about the hinge pivots 28 and 29. The entire shovel 16 is substantially balanced about the pivots 28 and 29 with a slight tendency of the shovel to tilt forwardly and downwardly whenever there is material in the shovel. When a load is lifted by the shovel 16, the normal center of gravity is forward of the pivots 28 and 29. Under such a condition the shovel will dump without other assistance. However, there are times when more material lodges in the heel of the shovel thus counterbalancing the slight tendency of the shovel to tip forwardly, and therefore even when the latch arms 38 and 39 are swung rearwardly about their pivots 40 and 41, the shovel 16 could remain in untipped position, and in order to alleviate this possibility, the upwardly inclined forward ends 46 of the bail members 44 and 45 cause an upward "kicking" of the roller wheels 35 as the latch units are swung rearwardly. This slight kicking or boosting of the roller wheels is ordinarily sufficient to cause an unbalancing of the shovel and a forward dumping or unloading of the shovel about the hinge pivots 28 and 29.

The latch arms 38 and 39 are joined by a transverse pipe or tubular member 47 so that movement of one arm 38 or 39 will cause a similar movement of the other arm. The arm 39 is equipped with an extension spring 48 which acts against the end 49 of the bail member 45 tending to push the arm 39 forwardly. This extension spring is provided with a swivel supporting bracket 50 on the frame arm 18. As previously stated, movement of either of these arms 38 or 39 causes similar movement in both of the arms. Hence, the action of the spring 48 tending to maintain the arm 39 in forward position similarly tends to maintain the arm 38 in a forward position through the medium of the cross pipe 47. A chain 51 is attached to the rear end of the bail member 44 at 52 and extends rearwardly to a rod 53 extending rearwardly to a hand-operated lever 54 which is pivoted at 55 on a substantially vertical frame member 56. The rear end of the chain and rod members 51 and 53 is attached to the lower end of the lever 54 at 57. Guide members 58 and 59 are provided for the rod member 53 along the top of the frame arm 17. A collar 60 is adjustably positioned on the rod 53 between the guide members 58 and 59, and a spring 61 coiled around the rod 53 is positioned between the guide 58 and the collar 60 tending to normally maintain the rod 53 in its foremost position. A second collar 112 is fixed to the rod 53 and limits the forward movement of the rod 53 by abutting the guide member 59. As shown in all of Figures 1, 2, and 3, the collar is shown in its position adjacent the guide member 59. In order to release the shovel for dumping, the hand lever 54 is pushed forwardly so that the rod 53 is pulled rearwardly against the action of the spring 61, thereby causing the ledges 42 and 43 of the arms 38 and 39 to be removed from the upper surface of the roller wheels 35 and also in a simultaneous action to kick the roller wheels 35 upwardly by the inclined ends 46 of the bail members 44 and 45, thus causing a forward tilting and an unloading of the shovel 16. The frame arms 17 and 18 are fixedly spaced apart by a large diameter tubular spacing member 62 thus supplying greater rigidity to these frame arms which must necessarily receive the entire lifting and twisting strains of the loading device. In order that the shovel 16 may not tilt too far forwardly, limit chains 63 and 64 are provided between a clamp member 65 attached to the spacing pipe or tube 62 and at each side of the shovel 16.

The swinging of the frame arms 17 and 18 about their pivots 19 on the tractor will, of course, effect a raising of the shovel 16. In order to raise these frame arms 17 and 18, hydraulic cylinders 66 are provided on each side of the tractor and have their rear ends attached at 67 to brackets 68 extending upwardly from the frame arms 17 and 18. The lifting means consists of a quadrilateral structure duplicated on each side of the tractor. The upright member 56 forms the rear side of this quadrilateral figure, and the arms 17 and 18 form the base or underside of this same structure. The upright members 56 are fixed rigidly to the tractor and remain in fixed position throughout all positions of the lifting device. In order to insure the rigidity of these upright members 56, brace members 69 are provided. The brace members are attached at 70 on the fore part of the chassis 12 and extend rearwardly and upwardly to a plate 71 closely adjacent the top of the members 56. Pivot arms 72 constitute the front side of the quadrilateral structures. These arms 72 comprise inner and outer plate members 73 and 74. The upper ends of the arms 72 provide pivotal support at 75 for the upper or top arms 76 of the quadrilateral structures. The lower ends of the arms 72 by means of a U-shaped strap 113 are welded to a torque resisting tube 77 which is journaled on a rigid pipe member 114 fixedly attached to plate members 115 and 116 and which in turn are attached to the inner sides of the channel beams 17 and 18 respectively. A welded extension 138 is provided on each end of the tube 77 to maintain proper centering of the tube 77 on the pipe 114. The pipe member 114 is similar and supplemental to the pipe member 62 which acts to maintain the fixed spacing between the channel beam members 17 and 18. The quadrilateral structures are spaced apart by the member 79 at the rear of the machine and at points adjacent the tops of the upright arms 56. The lower rear part of the structures are, of course, spaced by the tractor axle structure 15, and the forward and lower parts are spaced by the pipes 62 and 114. Inasmuch as both front arms 72 are rigidly attached to the tube 77 it is impossible to have the loader lift unevenly. If only one hydraulic cylinder is actuated or if they are not acting in perfect unison, the loader will still lift uniformly without injurious twisting by reason of their connection to the torque tube 77.

Figure 1:
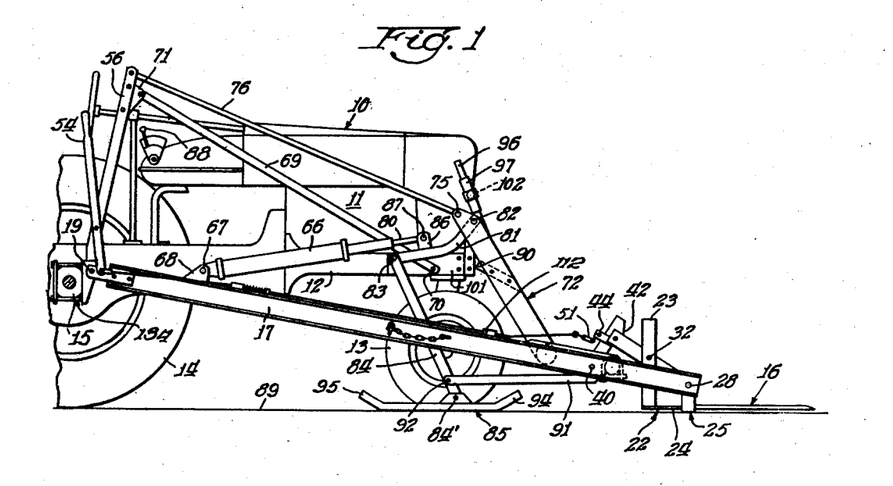
Figure 1 is a side elevational view of the loading attachment for tractors and showing the shovel portion thereof in its ground engaging position.
Figure 2:
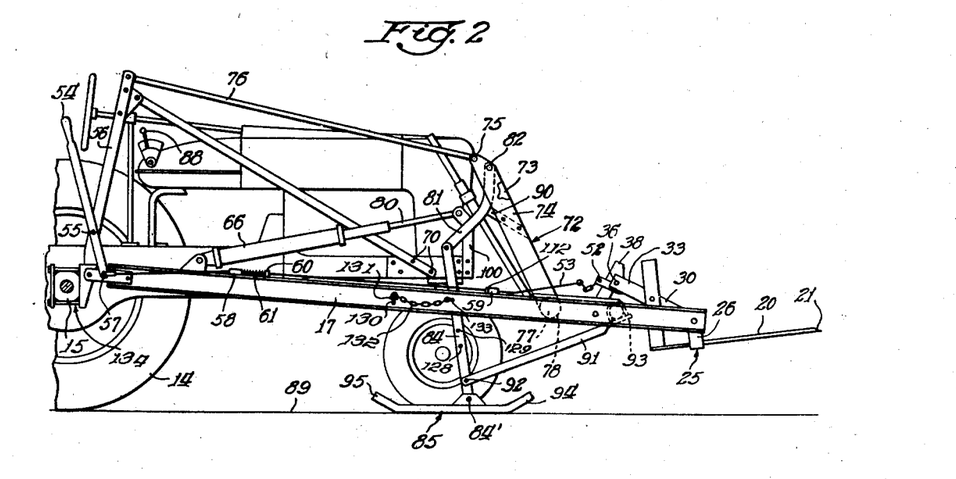
Figure 2 is a view similar to Figure 1 showing the shovel partially lifted.
Figures 5, 6, 7:
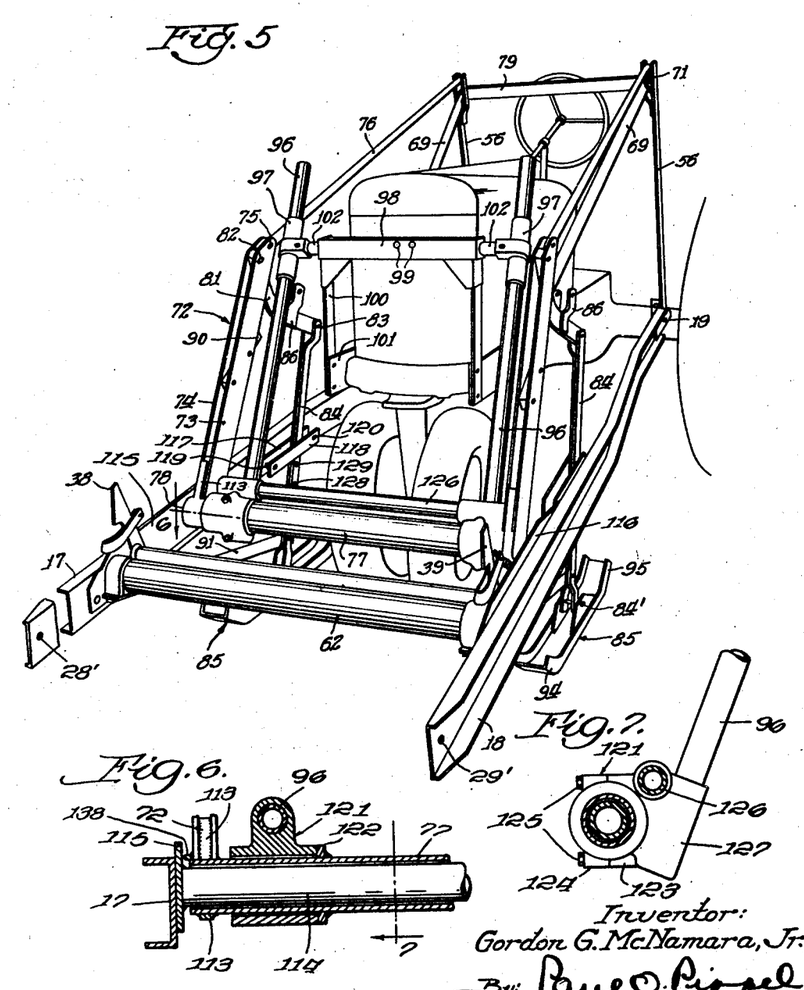
Figure 5 is a perspective view of the tractor-mounted loading device of this invention with parts removed to show structural details.
Figure 6 is a sectional view taken on the line 6 of Figure 5.
Figure 7 is another sectional view taken on the line 7 of Figure 6.

With the ordinary tractor loading attachment, extensible pistons 80 of the hydraulic cylinder 66 would be attached at the pivotal juncture between the top arm 76 and the forward arms 72. Upon actuation thereof the shovel 16 would be lifted as the frame arms 17 and 18 swing upwardly about their pivots 19. As specifically stated, it is one of the objects of this invention to eliminate the initial strain on the tractor which accompanies severing of the load of manure or the like from its pile. A toggle mechanism is provided intermediate the hydraulic extensible pistons 80 and the connection to the four-sided structures. As shown in Figure 1, this toggle mechanism comprises curved arms 81 which are pivotally attached to the arms 72 intermediate the inner and outer plates 73 and 74 at 82. The other ends of the arms 81 have attached thereto at 83 depending leg members 84 which are equipped with pivoted feet or runner members 85. These leg members 84 are guided centrally of their length by pairs of fixedly spaced guide plates 117 and 118. The guide plates, as best shown in Figure 5, have spacer members 119 and 120 and are attached to the channel beam members 17 and 18. Intermediate the ends of the curved arms 81 are upright brackets 86 which pivotally support the ends of the extensible pistons 80 at 87. Upon actuation of the manual control at 88, fluid is pumped to the hydraulic cylinders 66 by means of a pump, not shown, in the tractor, and the pistons 80 are moved forwardly thus creating a direct force on the pivot points 87. Inasmuch as the arms 81 are pivoted at 82, these arms will swing downwardly as the pistons come forwardly and simultaneously the legs are pushed downwardly. The pivoted feet 85 on the ends of the legs 84 prevent the entering of the legs into the ground and cause an upward force to be exerted on the side frame arms 17 and 18. The distance between the ground line 89 and the pivot 82 increases as shown in Figure 2. In this figure, the leg 84 and the curved arm 81 have reached their maximum angular position with respect to each other by reason of a brake or stop member 90 mounted between the inner and outer plate members 73 and 74 of the arms 72. It will be evident that at this point the continued extension of the pistons 80 will not cause a further downward movement of the legs 84 but rather will lift the entire loading device including the legs 84 about the pivots 19 of the arms 17 and 18. The leg members 84 are spaced by members 91 which extend between the legs 84 at connecting points 92 forwardly to the spacing pipe member 62 by means of U-shaped brackets as shown at 93. The guide members 117 and 118 maintain the legs 84 in a predetermined spaced apart position and prevent collapsing thereof when the legs are extended downwardly during preliminary lifting of the shovel. It will thus be understood that the arms 81 and the leg members 84 along with the members 91 constitute downwardly extensible structures by means of which the shoes or runner members 85 are moved against the ground during the initial lifting operation and are retracted with respect to the side frame members during the final portion of the spring movement.

Figure 3:
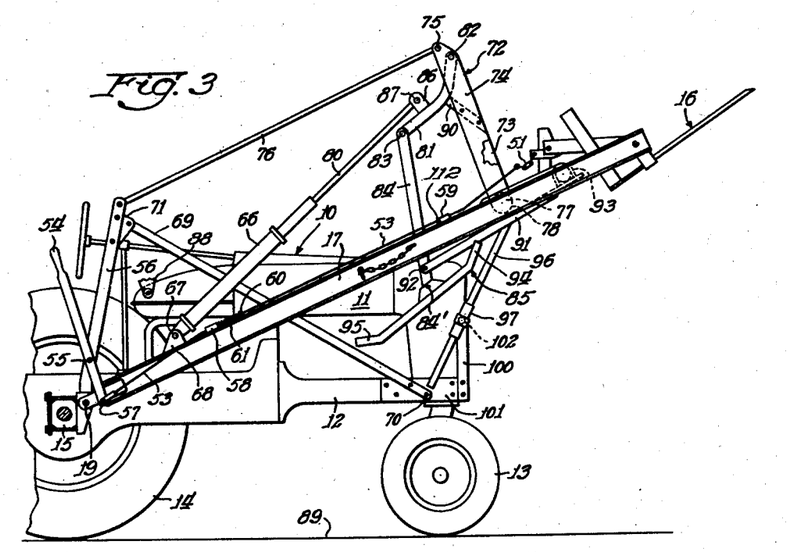
Figure 3 is another view similar to Figures 1 and 2 and showing the loader shovel in its uppermost position.
Figure 4:
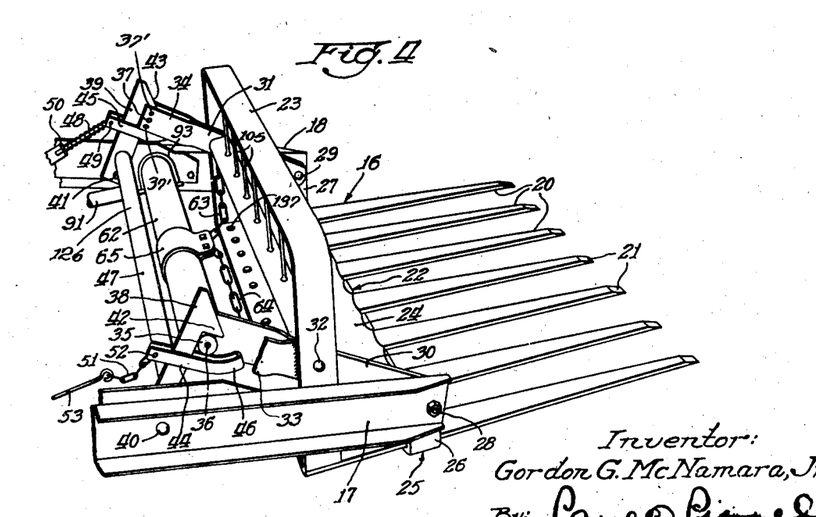
Figure 4 shows a perspective detail view of the loading device shovel.

This initial downward movement of the leg members 84 provides the loading device with self-contained load receiving means. In other words, the initial enormous force required to pry a portion of a pile of manure or other material loose is not transferred to the tractor but rather is received on these legs 84. The toggle used is so arranged that great lifting forces are at the disposal of the operator without in any way injuring or causing undue strain on the tractor or its tires on which the loading device is mounted. The mere weight of the material on the shovel is only a minor part of the force required to sever it from the pile. After this severing has taken place the tractor is fully able to receive the load on the shovel without causing any damage. As best shown in Figure 3, continued extension of the hydraulic pistons 80 acts to raise the entire loading device through the curved arm 81 and the stop member 90 forming a part of the forward arms 72. As the shovel 16 progresses from its position in Figure 2 to its position in Figure 3, the leg members 84 are pulled upwardly toward the channel beam members 17 and 18. This is accomplished by the particular arrangement of the toggle mechanism between the extending pistons 80 and the quadrilateral structures. Failure to retract the leg members 84 and hence the feet 85 would materially affect the scope of operation of the loader as the depending legs 84 and their feet 85 would be dangling in mid air. As will be seen in Figure 3, the members 91 which act to brace the legs 84 are retracted with respect to the side frame members and are pulled up to a position substantially parallel with the channel beams 17 and 18, and hence the feet or runner members 85 are in an out of the way position up under the beam members 17 and 18 of the loader when the loader is in dumping or mobile position.

The feet 85 as appears in Figure 5 are formed from channel irons and have their forward and rearward ends upwardly turned as at 94 and 95 respectively. The pivotal connection 84' between the legs 84 and the feet 85 is so arranged that a greater portion of the feet 85 extend rearwardly therefrom so that when the legs 84 begin their lifting movement with the entire loader, as shown in Figure 3, the feet members 85 will tilt downwardly and rearwardly so that the forward portions thereof will rise and rest against the underside of the brace members 91. This insures that the feet 85 will not interfere with the loading operation. As an alternative to the construction shown, the feet 85 may be pivoted centrally thereof to the arms 84, and in that case a weight or spring would preferably be provided in the rear part of the channel to cause tilting of the feet 85 in the same manner as shown and described for the offset pivot.

As best shown in Figure 5, additional guiding and spacing means are provided at the forward end of the loader. These means include a pair of spaced upwardly extending guide rods 96 which are pivotally supported at their lower ends on brackets 121 which are journaled on the pipe spacing member 77. The journal brackets 121 are maintained in spaced position on the pipe 77 by collar rings 122. The bracket members 121, as best shown in Figure 7, consist of inner and outer clamping portions 123 and 124 which are fastened together by means of bolts 125. An additional spacing pipe 126 is provided adjacent the sleeve spacing pipe 77. The rear portion 123 of the clamp-like bracket 121 is provided with a cylindrical portion 127 in which the guide rods 96 are firmly fastened. Sleeve-like sockets 97 are rotatably mounted on a bracket member 98 which is attached to the front end of the tractor as at 99 and has depending side arms 100 fastened to a plate 101 in turn attached to the chassis 12 of the tractor. When the shovel is raised by actuation of the hydraulic cylinders 66, the guide rods 96 are adapted to slide within the sleeve members 97 and also rotate about the journals 102 in the bracket 98. Thus, when the shovel is in its uppermost position as shown in Figure 3, the guide rods 96 extend downwardly and slightly rearwardly through the sleeve members 97.

The loader is adapted for quick attachment and detachment to the tractor, and in order to facilitate this quick attachment, means are provided for holding up the channel beams 17 and 18 in fixed position with respect to the legs 84 when the loader is detached from the tractor rear axle housing. As best shown in Figure 2, pairs of aligned holes 128 and 129 are provided in the legs 84. A pin 130 is normally retained in a bracket 131 in each of the channel beams 17 and 18. The pin 130 is mounted on the end of a chain 132 which is anchored at 133 on the channel beam 17. When it is desired to remove the tractor from the loader, the pin 130 is removed from its bracket 131 and inserted through the hole 128 in the leg 84. The shovel is then permitted to drop to its position as shown in Figure 1, and it will be realized that the guide plates 117 and 118 which form part of the beam 17 will rest directly on the pins 130. In spite of the removal of the clamping members around the tractor rear axle housings, the channel beams 17 and 18 will be maintained in an upwardly and rearwardly inclined position at the same height as the rear axle housings of the tractor. Under such circumstances the tractor may be driven rearwardly from its position within the power loader, and in order to reattach the loader to the tractor, the tractor is merely driven forwardly into the space between the channel beams 17 and 18. These beams which have remained at the proper height for ready attachment to the rear axle housings of the tractor are attached to these housings by the clamping members 134. It is possible, therefore, for a single workman to attach and detach the loader of this invention.

There are times when it is desired to eliminate the function of the legs 84, and in order to accomplish this the pin 130 is inserted in the hole 129 in the leg 84 when the channel beam 17 is down beneath the level of the hole 129. It will be apparent that as the leg 84 is extended by reason of operation of the hydraulic cylinder 66 and its forwardly moving piston 80, the pin 130 will be forced against the top of the guide plates 117 and 118 and will be prevented from passing. Hence rather than the legs 84 being moved downwardly, the lifting of the shovel 16 will occur immediately. When this pin 130 is employed in the hole 129, the operation of the toggle between the hydraulic piston 80 and the quadrilateral structure is completely eliminated, and the piston 80 acts to directly lift the arms 74 and 76 of the quadrilateral structure. However, under normal operating conditions elimination of the supporting leg 84 is not particularly desirable, but it is believed necessary to provide means whereby the leg could be taken out of operation and the loader still function.

It is believed that herein is provided a substantial power operated loader particularly for use with manure which will effectively lift loads other similar loaders cannot possibly handle and yet not disable the mobility of the machine. Numerous details of construction may be varied without departing from the principles of the invention, and I therefore do not propose limiting the patent granted hereon otherwise than as necessitated by the appended claims.

What is claimed is:

1. In a tractor-mounted loader, arms pivoted to the tractor and extending forwardly therefrom, a shovel attached to said arms, supporting members attached to said arms for relative movement thereto, toggle means on the tractor for initially extending the supporting members downwardly to ground-engaging position and means for raising said arms on said ground-engaging members, and toggle limit means for causing simultaneous raising of the supporting members with the arms after initial raising of said arms.

2. In a tractor-mounted loader, arms pivoted to the tractor and extending forwardly therefrom, a shovel attached to said arms, supporting members attached to said arms for relative movement thereto, toggle means on the tractor for extending the supporting members downwardly to ground-engaging position and raising said arms on said ground-engaging supporting members, and means for simultaneously raising the supporting members and for continuing the raising of the arms.

3. In a tractor-mounted loader, arms pivoted to the tractor and extending forwardly therefrom, a material holding device at the end of said arms, each of said arms forming the lower side of a quadrilateral structure, supporting members attached to said quadrilateral structures by toggle connections, and extensible members positioned between said arms and said toggle connections, whereby extension of said extensible members will cause an initial downward extension of said supporting members into ground-engaging position on which the arms are partially lifted, and whereby continued extension of said extensible members will cause a raising of said arms on said tractor.

4. In a tractor-mounted loader, arms pivoted to the tractor substantially at the rear thereof and extending forwardly therefrom, a material holding device at the forward end of said arms, each of said arms forming the lower side of a quadrilateral structure, supporting members attached to said quadrilateral structures by toggle connections, and hydraulically operable extensible members positioned between said arms and said toggle connections, whereby extension of said extensible members will cause an initial downward extension of said supporting members into ground-engaging position on which the arms are partially lifted, and whereby continued extension of said extensible members will cause a raising of said arms on said tractor.

5. In a loading device, a pair of arms pivoted on a support, a shovel pivoted in substantially balanced position at the ends of said arms, latch means interposed between the shovel and the arms to hold the shovel in fixed relationship with respect to said arms, and means for remotely operating said latch and simultaneously upsetting the substantially balanced shovel, and said latch means comprising projections on said shovel and cooperative keeper members on said arms, said keeper members having shovel unbalancing actuators adapted to engage said projections and upset the shovel.

6. In a loading device, a pair of arms pivoted on a support, a shovel pivoted on said arms in substantially balanced position, a latch mechanism including roller members on said shovel and keeper members and cooperative unbalancing actuators on said arms for normally holding said shovel non-movable relative to said arms, a remotely controlled latch actuator adapted to disengage the keeper members from the upper sides of said roller members and the unbalancing actuators adapted to upset the roller members after removal of the keeper members to positively tip the shovel about its pivotal connection to the arms.

7. A loading attachment for a tricycle tractor having a narrow body, a narrow front rolling support and spaced rear traction wheels comprising a frame including side frame members pivotally connected to the tractor adjacent the rear traction wheels and extending forwardly alongside the tractor body on opposite sides of the narrow front rolling support, a material holding structure mounted on said side frame members spaced forwardly of the tractor, lifting linkage connecting the tractor and the frame structure, power means operated by the tractor for actuating said linkage, said linkage including downwardly extensible structures provided with weight-supporting shoes engageable with the ground adjacent the front rolling support of the tractor, said linkage being constructed and arranged to initially move said shoes downwardly relative to the side frame members whereby the force exerted during the initial lifting operation on the material holding structure is carried directly on the ground independent of the front rolling support of the tractor, said linkage being constructed and arranged to subsequently lift the side frame members with respect to the tractor by force then exerted directly on the tractor, the ground supporting shoes being then lifted from the ground along with the side frame members.

8. A loading attachment for a tricycle tractor having a narrow body, a narrow front rolling support and spaced rear traction wheels comprising a frame including side frame members pivotally connected to the tractor adjacent the rear traction wheels and extending forwardly alongside the tractor body on opposite sides of the narrow front rolling support, a material holding structure mounted on said side frame members spaced forwardly of the tractor, lifting linkage connecting the tractor and the frame structure, power means operated by the tractor for actuating said linkage, said linkage including downwardly extensible structures provided with weight-supporting elongated shoes engageable with the ground adjacent the front rolling support of the tractor, said shoes being curved upwardly at each end and being pivotally connected intermediate their ends to the lifting linkage whereby the tractor and loading attachment may be moved fore and aft with the load on the material holding structure carried on said shoes, said linkage being constructed and arranged with a force multiplying leverage system to initially move said shoes downwardly relative to the side frame members with an amplified force capacity whereby the force exerted during the initial lifting operation on the material holding structure is carried directly on the ground independent of the front end of the tractor and of the front rolling support, said linkage being constructed and arranged to subsequently lift the side frame members with respect to the tractor with a reduced mechanical leverage advantage, the applied force then being exerted directly on the tractor, the ground supporting shoes being then lifted from the ground along with the side frame members.

9. A loading attachment for a tricycle tractor having a narrow body, a narrow front rolling support and spaced rear traction wheels comprising a frame including side frame members pivotally connected to the tractor adjacent the rear traction wheels and extending forwardly alongside the tractor body on opposite sides of the narrow front rolling support, a material holding structure mounted on said side frame members spaced forwardly of the tractor, lifting linkage connecting the tractor and the frame structure, power means operated by the tractor for actuating said linkage, said linkage including downwardly extensible structures provided with weight-supporting shoes engageable with the ground adjacent the front rolling support of the tractor, said linkage being constructed and arranged to initially move said shoes downwardly relative to the side frame members whereby the force exerted during the initial lifting operation on the material holding structure is carried directly on the ground independent of the front rolling support of the tractor, said linkage being constructed and arranged to subsequently lift the side frame members with respect to the tractor by force then exerted directly on the tractor, the ground supporting shoes being then lifted from the ground along with the side frame members, said shoes and the downwardly extensible structure being located rearwardly of the material holding structure and being retractible by the lifting linkage in an upward direction with respect to the side frame members during the last lifting movement of the side frame members whereby said shoes are retracted out of interfering position with respect to load discharge from the material holding structure.

10. A loading attachment for a tricycle tractor having a narrow body, a narrow front rolling support and spaced rear traction wheels comprising a frame including side frame members pivotally connected to the tractor adjacent the rear traction wheels and extending forwardly alongside the tractor body on opposite sides of the narrow front rolling support, a material holding structure mounted on said side frame members spaced forwardly of the tractor, lifting linkage connecting the tractor and the frame structure, power means operated by the tractor for actuating said linkage, said linkage including downwardly extensible structures provided with weight-supporting elongated shoes engageable with the ground adjacent the front rolling support of the tractor, said shoes being curved upwardly at each end and being pivotally connected intermediate their ends to the lifting linkage whereby the tractor and loading attachment may be moved fore and aft with the load on the material holding structure carried on said shoes, said linkage being constructed and arranged with a force multiplying leverage system to initially move said shoes downwardly relative to the side frame members with an amplified force capacity whereby the force exerted during the initial lifting operation on the material holding structure is carried directly on the ground independent of the front end of the tractor and of the front rolling support, said linkage being constructed and arranged to subsequently lift the side frame members with respect to the tractor with a reduced mechanical leverage advantage, the applied force then being exerted directly on the tractor, the ground supporting shoes being then lifted from the ground along with the side frame members, said shoes and the downwardly extensible structures being located rearwardly of the material holding structure and being retractible by the lifting linkage in an upward direction with respect to the side frame members during the last portion of the lifting movement of the side frame members whereby said shoes are retracted out of interfering position with respect to load discharge from the material holding structure.

11. A loading attachment for a tractor comprising a frame including side frame members pivotally connected to the tractor, a material holding structure mounted on said side frame members, lifting linkage connecting the tractor and the frame structure, power means operated by the tractor for actuating said linkage said linkage including a downwardly extensible structure provided with a weight-supporting shoe engageable with the ground, said linkage being constructed and arranged to initially move said shoe downwardly relative to the side frame members whereby the force exerted during the initial lifting operation on the material holding structure is carried directly on the ground independent of the tractor, said linkage being constructed and arranged to subsequently lift the side frame members with respect to the tractor by force then exerted directly on the tractor, the ground supporting shoe being then lifted from the ground along with the side frame members, said shoe and the downwardly extensible structure being located rearwardly of the material holding structure and being retractible by the lifting linkage in an upward direction with respect to the side frame members during the last portion of the lifting movement of the side frame members whereby said shoe is retracted out of interfering position with respect to load discharge from the material holding structure.

12. A loading attachment for a tractor, comprising a frame including side frame members pivotally connected to the tractor, a material holding structure mounted on said side frame members, lifting linkage connecting the tractor and the frame structure, power means operated by the tractor for actuating said linkage, said linkage including downwardly extensible structures connected to the side frame members and provided with weight-supporting shoes engageable with the ground, said linkage being constructed and arranged to initially move said shoes downwardly relative to the side frame members whereby the force exerted during the initial lifting operation on the material holding structure is carried directly on the ground independent of the tractor, said linkage being constructed and arranged to subsequently lift the side frame members with respect to the tractor by force then exerted directly on the tractor, the ground supporting shoes being then lifted from the ground along with the side frame members, said shoes and the downwardly extensible structures being located rearwardly of the material holding structure and being retractible by the lifting linkage in an upward direction with respect to the side frame members during the last portion of the lifting movement of the side frame members whereby said shoes are retracted out of interfering position with respect to load discharge from the material holding structure.

GORDON G. McNAMARA, Jr.

REFERENCES CITED

The following references are of record in the file of this patent:

UNITED STATES PATENTS

| Number | Name | Date |
|---|---|---|
| 2,116,351 | Jones et al. | May 3, 1938 |
| 2,326,338 | Drott et al. | Aug. 10, 1943 |
| 2,305,119 | Walker | Dec. 15, 1942 |
| 2,332,742 | Mott | Oct. 26, 1943 |
| 2,336,390 | Boll | Dec. 7, 1943 |
| 2,357,954 | Johnson | Sept. 12, 1944 |
| 2,366,378 | Barrett | Jan. 2, 1945 |